United States Patent Office 3,463,275
Patented Aug. 26, 1969

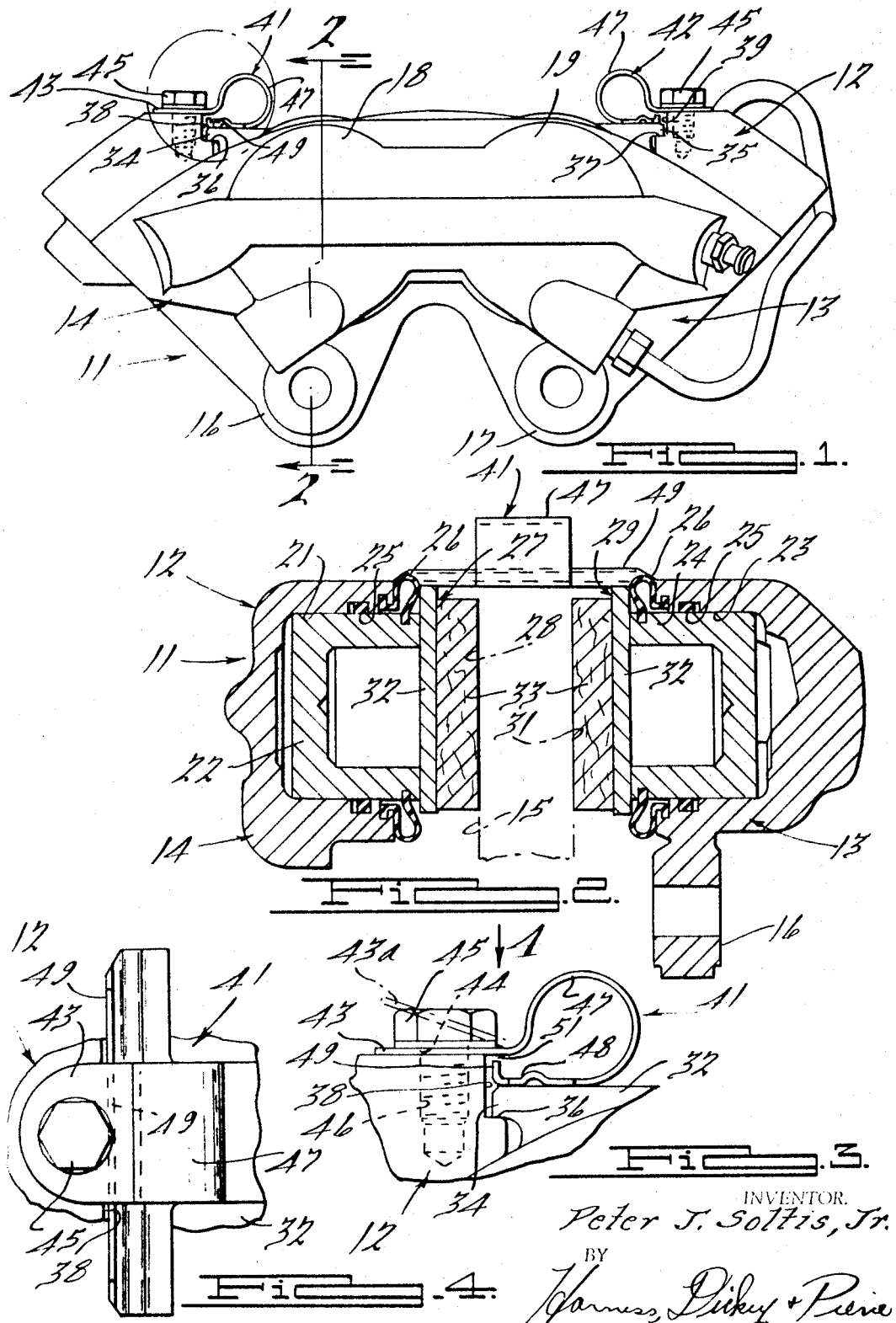

3,463,275
ANTIRATTLE DEVICE FOR DISK BRAKES
Peter J. Soltis, Jr., Detroit, Mich., assignor to Kelsey-Hayes Company, a corporation of Delaware
Filed Feb. 15, 1968, Ser. No. 705,726
Int. Cl. F16d 55/04
U.S. Cl. 188—73                              3 Claims

ABSTRACT OF THE DISCLOSURE

A disk brake assembly having oppositely disposed brake pads that are brought into engagement with an associated disk by means of four hydraulically operated pistons. The pistons are carried by a caliper assembly and antirattle springs affixed to the caliper engage the backing plates of the brake pads for yieldably resisting their movement. A positive stop is provided on the antirattle spring means for limiting the degree of such yieldable movement.

Background of the invention

This invention relates to the field of disk brakes and more particularly to an improved antirattle device for such brakes.

In a vehicular disk brake assembly a pair of brake pads are supported either directly or indirectly by a caliper on opposite sides of an associated brake disk. The support for the brake pads must permit the pads to move into frictional engagement with the associated disk, should effectively resist frictional torque induced rotation of the pads upon engagement with the disk and should permit relatively rapid replacement of the pads. Normally, the friction pads incorporate backing plates that engage a portion of the associated caliper assembly for providing the necessary support for the pads and for achieving the aforenoted functions. Due to manufacturing tolerances, some clearance must be provided between the abutting surfaces of the backing plates and the caliper assembly. The provision of this clearance can give rise to several types of noise problems. For example, when the brake pad is supported with such a clearance the pad may vibrate with respect to the caliper generating an objectionable noise or rattle. It has, therefore, been proposed to employ a yieldable member that urges the brake pads into abutting relationship with the associated supporting surface of the caliper. The use of such yieldable means, commonly called antirattle springs, however, may permit undesirably large movements of the brake pads either during their actuation or when they are subjected to vibratory forces.

It is, therefore, a principal object of this invention to provide an improved antirattle device for disk brakes.

It is another object of the invention to provide an antirattle spring for a disk brake that yieldably resists limited movement but which positively restricts the movement to a predetermined value.

Summary of the invention

A disk brake embodying this invention is particularly adapted for association with a rotatable disk and may find specific application in vehicular wheel brakes. The disk brake assembly includes a caliper that is adapted to be supported relative to the disk and a brake pad that is juxtaposed to the caliper and to an associated braking surface of the disk. Actuating means are carried by the caliper for urging the brake pad into frictional engagement with the associated braking surface of the disk. Antirattle spring means are operatively interposed between the caliper and the brake pad for yieldably resisting movement of the brake pad relative to the caliper in a plane parallel to the braking surface of the disk. The antirattle spring means include abutment means for positively limiting the degree of yieldable relative movement of the brake pad in at least one direction in the plane.

An antirattle spring means of the type described in the preceding paragraph may comprise a generally planar mounting section that is adapted to be affixed to the caliper, an arcuate section integrally connected at one of its ends to one end of the mounting section, a brake pad engaging section formed integrally at the other end of the arcuate section and juxtaposed to the mounting section and an abutment portion angularly disposed to the brake engaging section and positioned to engage the adjacent area of the mounting section upon a predetermined degree of yielding movement of the arcuate section.

Brief description of the drawings

FIGURE 1 is a side elevational view of a portion of a disk brake assembly embodying this invention.

FIGURE 2 is an enlarged cross-sectional view taken in the direction of the line 2—2 in FIGURE 1 and showing the brake assembly juxtaposed to an associated disk.

FIGURE 3 is an enlarged side elevational view of the area encompassed by the circle in FIGURE 1.

FIGURE 4 is a top plane view taken in the direction of the arrow 4 in FIGURE 3.

Detailed description of the preferred embodiment

In the drawings a disk brake assembly embodying this invention is identified generally by the reference numeral 11. The disk brake assembly 11 is comprised of a caliper, indicated generally by the reference numeral 12, which caliper has spaced, integrally connected leg portions 13 and 14 that are adapted to be disposed on opposite sides of an associated disk, indicated generally by the reference numeral 15 and shown in phantom lines in FIGURE 2. The caliper leg 13 is provided with inwardly extending bosses 16 and 17 for affixing the caliper 12 against rotation with respect to the disk 15 in any known manner.

The leg 14 defines fluid motor portions 18 and 19 each of which is formed with a cylinder bore 21 in which a hydraulically actuated piston 22 is supported. In a like manner, the caliper leg 13 is formed with fluid motor portions that define cylinder bores 23 in which hydraulically actuated pistons 24 are supported. A generally rectangular seal 25 is interposed between each of the cylinder bores 21 and 23 and the respective pistons 22 and 24 for effecting a seal in this area and for exerting a restoring force upon the pistons 22 and 24 in a known manner. Flexible boots 26 are also interposed between the outer extremities of the cylinder bores 21 and 23 and the respective pistons 22 and 24 to preclude against the ingress of dirt and other foreign material.

A brake pad, indicated generally by the reference numeral 27, is interposed between the pistons 22 and one braking surface 28 of the disk 15. In a like manner, a second brake pad, indicated generally by the reference numeral 29, is interposed between the pistons 24 and an opposing braking surface 31 of the disk 15. When the pistons 22 and 24 are actuated by pressurizing the cylinders 21 and 23 in any known manner, the brake pads 27 and 29 will be forced into frictional engagement with the respective disk braking surfaces 28 and 31.

In order to support the brake pads 27 and 29 with respect to the caliper assembly 12, each of the brake pads is formed with a like shaped backing plate 32 to which a frictional lining 33 is secured in any known manner. The backing plates 32 are formed with outwardly extending ears 34 and 35 (FIGURES 1 and 3) at their upper ends tht are slidingly engaged on shoulders 36 and 37 formed by the adjacent portion of the caliper 12. The ears 34 and 35 may also be adapted to abuttingly engage vertically extending surfaces 38 and 39 formed adjacent the shoulders 36 and 37, respectively, for precluding any substantial rotation of the brake pads 27 and 29 when they engage the disk 15. Alternatively, the frictional braking torque may be taken in any other known manner wherein rotation of the brake pads 27 and 29 with the disk 15 is precluded.

Since the brake pads 27 and 29 are supported for sliding movement relative to the caliper 12, it necessarily follows that there will be some clearance between the backing plates 32 and the caliper 12 due to manufacturing tolerances and to permit free movement. Movement of the brake pads 27 and 29 in a vertical direction or radially with respect to the disk 15 may occur due to these clearances. This relative movement, which will be caused by vibration when the associated vehicle is driven down a road or under various other circumstances, may give rise to objectionable brake noise and rattling. Hold down spring assemblies, indicated generally by the reference numerals 41 and 42 and shown in most detail in FIGURES 3 and 4, are provided for yieldably resisting this relative movement and for positively limiting the degree of such movement.

The configuration of each of the hold down spring assemblies 41 and 42 is identical and, therefore, only the spring assembly 41 will be described in detail by particular reference to FIGURES 3 and 4. The hold down spring assembly 41 may be formed from spring steel or the like having relatively thin gauge.

The spring 41 consists of a generally planar mounting section 43 in which an aperture 44 is formed so as to accommodate a hold down bolt 45 that is threaded into a tapped opening 46 formed in the caliper. The mounting portion 43 extends adjacent and parallel to the caliper shoulder 36 at its inner end and terminates in an integral arcuate section 47. The mounting section 43 and arcuate section 47 have substantially the same width and this width can be less than the distance between the backing plates 32 of the respective brake pads 27 and 29 as shown in FIGURE 2. The opposite end of the arcuate section 47, however, is integrally connected to an elongated backing plate engaging section 48 that has sufficient width to span the backing plates 35 of the shoes 27 and 29 and engage these backing plates adjacent their ears 34. The inner end of the backing plate engaging section 48 terminates in an upwardly extending abutment or stop 49 that extends substantially perpendicularly to the section 48 and toward the mounting section 43.

In its preassembled condition, the mounting portion 43 may be disposed at an angle to the backing plate engaging section 48 as indicated by the dotted line position 43a in FIGURE 3. When the spring 41 is assembled to the caliper 12 by the insertion of the bolt 45, the mounting section 43 will be deflected toward the backing plate engaging section 48 through deformation of the arcuate section 47. The backing plate engaging section 48 cannot, of course, move during assembly since it will be engaged with the backing plate 32 which is, in turn, engaged with the shoulders 36 and 37. In the assembled position, a clearance or gap 51 exists between the upper end of the abutment section 48 and the lower surface of the mounting section 43. Hence, some resiliently opposed movement of the brake pads 27 and 29 is permitted within the degree of the clearance 51. This movement permits some floating of the brake pads 27 and 29 to insure good surface-to-surface engagement between the frictional linings 33 and the disk braking surfaces 38 and 31 and otherwise affords some tolerance in the system. Any substantial radial outward movement of the brake pads 27 and 29 will, however, be resisted since deflection of the arcuate section 47 will cause the clearance 51 to diminish until the upper end of the abutment or stop section 49 will engage the lower surface of the mounting portion 43.

While it will be apparent that the preferred embodiment of the invention disclosed is well calculated to fulfill the objects above stated, it will be appreciated that the invention is susceptible to modification, variation and change.

What is claimed is:

1. In a disk brake for association with a rotatable disk, a caliper adapted to be supported relative to the disk, a brake pad juxtaposed to said caliper and to an associated braking surface of the disk, said brake pad including a backing plate, actuating means carried by said caliper for urging said brake pad into frictional engagement with the associated braking surface of the disk, and antirattle spring means operatively interposed between said caliper and said brake pad for yieldably resisting movement of said brake pad relative to said caliper in a plane parallel to the braking surface of the disk, said antirattle spring means having a first section affixed to the caliper, a second section engaged with said backing plate, and abutment means formed at the termination of said second section and angularly related thereto, said abutment means being adapted to engage said first section for positively limiting the degree of yieldable relative movement of said brake pad in at least one direction in said plane.

2. A disk brake as set forth in claim 1 further including a second brake pad associated with the caliper, said second brake pad being positioned on the opposite side of the disk to the first mentioned brake pad, the antirattle spring means being engaged with each of said brake pads.

3. An antirattle spring for association with a disk brake for yieldably resisting movement of a brake pad relative to an associated caliper and for positively limiting the degree of such relative movement after a predetermined degree of such yieldably resisted movement, said spring comprising a generally planar mounting section adapted to be affixed to the caliper, an arcuate section integrally connected at one of its ends to one end of said mounting section, a brake pad engaging section integrally connected to the other end of said arcuate section and underlying in part said mounting section, said brake pad engaging section being adapted to engage a backing plate of an associated brake pad for deflection of said arcuate section upon movement of the brake pad relative to the caliper, and an abutment section integrally connected to said brake pad engaging section and angularly related thereto, said abutment section extending toward said mounting section for engaging said mounting section upon a predetermined degree of deflection of said arcuate section.

References Cited

UNITED STATES PATENTS 3,294,205 12/1966 Shanz.
3,298,469 1/1967 Robinette _____ 188—73

OTHER REFERENCES

German printed application 1,194,275 (1965).

GEORGE E. A. HALVOSA, Primary Examiner

U.S. Cl. X.R.

188—205; 267—1